(12) United States Patent
Higano et al.

(10) Patent No.: US 8,979,607 B2
(45) Date of Patent: Mar. 17, 2015

(54) METHOD OF MANUFACTURING LIQUID CRYSTAL DISPLAY PANEL

(71) Applicant: Japan Display Inc., Minato-ku (JP)

(72) Inventors: Toshiyuki Higano, Tokyo (JP); Kenji Nakao, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/341,129

(22) Filed: Jul. 25, 2014

(65) Prior Publication Data

US 2015/0044933 A1  Feb. 12, 2015

(30) Foreign Application Priority Data

Aug. 12, 2013 (JP) .................. 2013-167459

(51) Int. Cl.
*H01J 9/26* (2006.01)
*G02F 1/1339* (2006.01)
*G02F 1/1337* (2006.01)

(52) U.S. Cl.
CPC ........ *G02F 1/1339* (2013.01); *G02F 1/133788* (2013.01)
USPC .............................................. 445/25; 445/24

(58) Field of Classification Search
USPC ...................................... 445/24–25
See application file for complete search history.

(56) References Cited

U.S. PATENT DOCUMENTS

| | | | |
|---|---|---|---|
| 2005/0275348 A1* | 12/2005 | Choi et al. | 313/512 |
| 2006/0061719 A1 | 3/2006 | Tomioka et al. | |
| 2009/0066215 A1* | 3/2009 | Kweon | 313/485 |
| 2010/0225865 A1 | 9/2010 | Tomioka et al. | |
| 2011/0301324 A1 | 12/2011 | Tomioka et al. | |
| 2012/0211080 A1* | 8/2012 | Niiyama et al. | 136/259 |

FOREIGN PATENT DOCUMENTS

| | | |
|---|---|---|
| JP | 9-222613 | 8/1997 |
| JP | 2000-267118 | 9/2000 |
| JP | 2004-206091 | 7/2004 |

\* cited by examiner

*Primary Examiner* — Anne Hines
(74) *Attorney, Agent, or Firm* — Oblon, McClelland, Maier & Neustadt, L.L.P.

(57) ABSTRACT

According to one embodiment, there is provided a method of manufacturing a liquid crystal display panel, which includes preparing a pair of substrates including respective alignment films formed therein and subjected to photo alignment treatment, providing a sealing material on a frame area of the alignment film of one of the pair of substrates, and bonding the pair of substrates to each other with the sealing material, and curing the sealing material to form a sealing member, and forming a liquid crystal layer in space surrounded by the pair of substrates and the sealing member. The sealing material satisfies the following formula $B \leq 2000$ [μm]/A.

3 Claims, 10 Drawing Sheets

METHOD OF MANUFACTURING LIQUID CRYSTAL DISPLAY PANEL

CROSS-REFERENCE TO RELATED APPLICATIONS

This application is based upon and claims the benefit of priority from Japanese Patent Application No. 2013-167459, filed Aug. 12, 2013, the entire contents of which are incorporated herein by reference.

FIELD

Embodiments described herein relate generally to a method of manufacturing a liquid crystal panel.

BACKGROUND

In recent years, as display panels, liquid crystal display panels have been developed. They are featured in that they are light and thin and also have high resolution. In general, a liquid crystal display panel comprises an array substrate, a counter-substrate disposed opposite to the array substrate, with a predetermined gap therebetween, a sealing member by which the array substrate and the counter-substrate are joined to each other, and a liquid crystal layer formed in a space surrounded by the array substrate, the counter-substrate and the sealing member.

The array substrate and the counter-substrate include respective alignment films contacting the liquid crystal layer. The alignment films are subjected to rubbing. Thereby, the alignment films can control initial alignment of liquid crystal molecules.

It should be noted that in the case where alignment films are subjected to rubbing, the following problems arise: an element (TFT) is broken by static electricity generating due to friction; and a display failure (disorder in alignment of liquid crystal molecules) occurs due to dust generated by the rubbing. In order to solve those problems occurring due to the rubbing, it is studied what method is applicable as a so-called rubbing-less alignment method for controlling alignment of liquid crystal molecules without rubbing.

In view of the above, it is studied whether photo alignment treatment is applicable as a rubbing-less alignment method for obtaining a liquid crystal display panel which is high in manufacturing yield and display quality. The photo alignment treatment can be carried out by radiating linearly polarized light onto an alignment film. Thereby, the alignment film subjected to the photo alignment treatment can control initial alignment of liquid crystal molecules.

DETAILED DESCRIPTION

In general, according to one embodiment, there is provided a method of manufacturing a liquid crystal display panel, comprising: preparing a pair of substrates having respective alignment films formed therein and subjected to photo alignment treatment; providing a sealing material on a frame area of the alignment film of one of the pair of substrates; bonding the pair of substrates to each other with the sealing material, and curing the sealing material to form a sealing member; and forming a liquid crystal layer in space surrounded by the pair of substrates and the sealing member, wherein the sealing material satisfies the following formula: $B \leq 2000$ [µm]/A where A is a width (µm) of the sealing material, and B is a volume shrinkage ratio (%) of the sealing material in the case where the sealing material is cured to form the sealing member.}

First of all, a concept of an embodiment will be explained.

In the liquid crystal display panel, in order to achieve initial alignment of liquid crystal molecules of a liquid crystal layer, there is a case where photo alignment treatment is carried out as alignment treatment for alignment films of an array substrate and a counter-substrate. Also, there is a case where as the alignment films, photo-decomposition type alignment films having a cyclobutane ring are applied. It should be noted that a rough molecule structure of each of the alignment films is expressed by the following chemical formula:

A photo-decomposition type alignment film subjected to photo alignment treatment is an alignment film decomposed by light such that only chains along a desired direction remain, and initial alignment of liquid crystal molecules is achieved. The photo alignment treatment is carried out by applying linearly polarized light to the alignment film. It should be noted that as the linearly polarized light, for example, linearly polarized ultraviolet light (hereinafter referred to as polarized UV) can be used.

Figure 12:
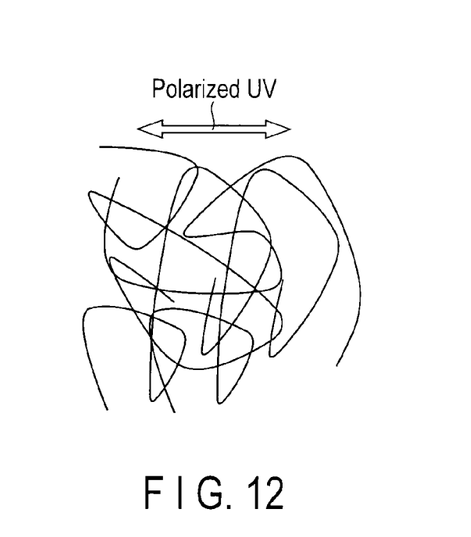
FIG. 12 is a view schematically showing a state of chains in an alignment film, to which a polarized UV has not yet been emitted.

In the case of forming a photo-decomposition type alignment film subjected to photo alignment treatment, first, a substrate is coated with an alignment film material; that is, a coat film formed of an alignment film material is provided on the substrate. This coat film can be used as an alignment film. FIG. 12 schematically shows a state of chains of the alignment film, to which polarized UV has not yet been emitted. In FIG. 12, an arrow denotes a polarization axis of polarized UV to be emitted.

Figure 13:
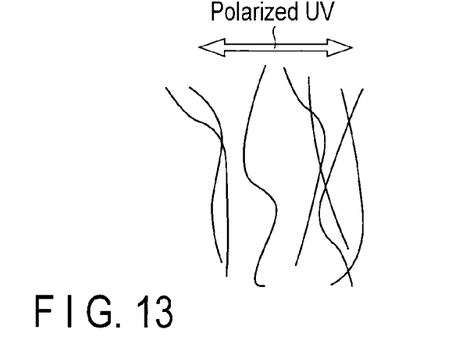
FIG. 13 is a view schematically showing a state of chains in the alignment film, to which a polarized UV has been emitted.

Then, polarized UV is emitted to the alignment film. FIG. 13 schematically shows a state of chains of the alignment film, which the polarized UV has been emitted. In FIG. 13, an arrow indicates a polarization axis of the emitted polarized UV. As can be seen from FIG. 13, when polarized UV is emitted, chains of the alignment film are selectively decomposed, and chains in a direction perpendicular to the polarization axis of the polarized UV remain.

Figure 14:
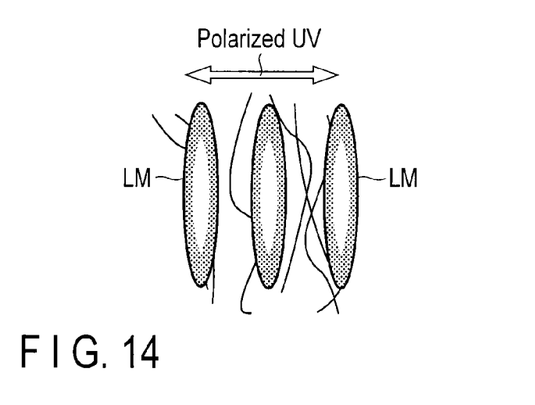
FIG. 14 is a schematic view showing an initial alignment state of liquid crystal molecules and chains of the alignment film, to which the polarized UV has been emitted.

As a result, a photo-decomposition type alignment film subjected to the photo alignment treatment is formed. Then, as can be seen from FIG. 14, after a liquid crystal display panel is completely formed, initial alignment of liquid crystal molecules LM close to the alignment film is achieved along the remaining chains. That is, in a direction perpendicular to the polarization axis of the polarized UV, initial alignment of the liquid crystal molecules LM close to the alignment film can be achieved. It should be noted that in FIG. 14, an arrows indicates a polarization axis of an emitted polarized UV. The above explanation is given by referring to by way of example the case where the liquid crystal layer is formed of a liquid crystal material (a positive type liquid crystal material) having a positive dielectric anisotropy.

By carrying out the photo alignment treatment in the above way, it is possible to obtain an advantage which cannot be obtained in the case of applying rubbing. That is, in the above way, it is not necessary to perform rubbing on the alignment film, and it is therefore possible to solve a problem in which an element (TFT) is broken due to static electricity generated by friction. It is also possible to prevent a display failure (disorder in alignment of liquid crystal molecules LM) which would occur due to dust or the like generated by rubbing. As can be seen from the above, by applying the photo alignment treatment, it is possible to provide a liquid crystal panel which is high in yield and display quality, and also a method of manufacturing the same.

It should be noted that an inventor discovered that an alignment film to which a polarized UV has been emitted has the following problem: an adhesive strength between an array substrate and a counter-substrate adhered to each other by a sealing member formed on alignment films of the array substrate and the counter-substrate lowers (the sealing member varies to easily peel off the array substrate and the counter-substrate).

Figure 15:
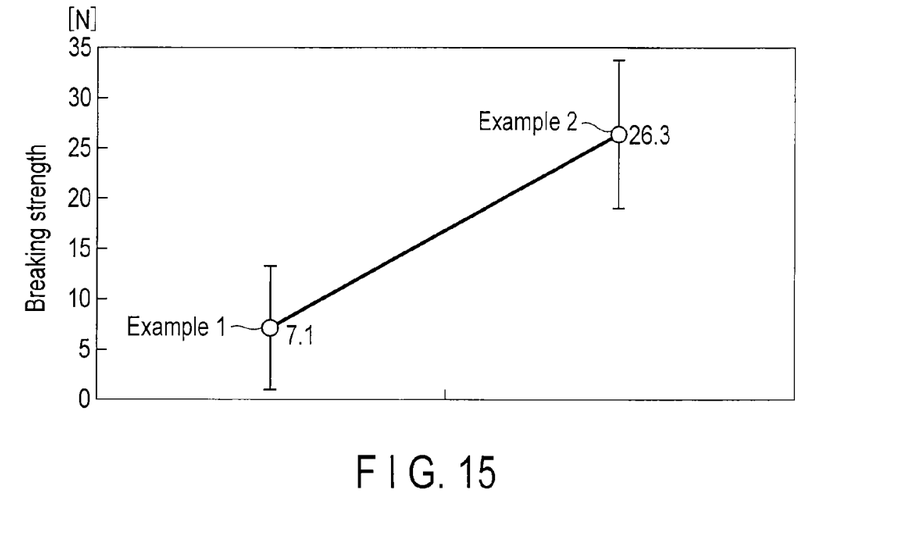
FIG. 15 is a view showing as a graph a result of measurement of breaking strengths of liquid crystal display panels of examples 1 to 3.

FIG. 15 shows a result of evaluation of the adhesive strength between the array substrate and the counter-substrate. In the figure, an adhesive strength of a liquid crystal display panel of example 1 is shown as a sample. In example 1, alignment films for photo alignment are applied as alignment films of the example, an array substrate and a counter-substrate are adhered to each other by an ultraviolet-setting type sealing material formed to have a volume shrinkage ratio of 5.1%, and ultraviolet light are emitted onto the sealing material to cure the sealing material, thereby forming a sealing member.

It should be noted that the above volume shrinkage ratio is a volume shrinkage ratio of the sealing material in the case where the sealing material is cured to form the sealing member, and also the shrinkage ratio of the sealing material in the width direction of the sealing material is substantially equal to that in the thickness direction of the sealing material.

With respect to example 2, FIG. 15 shows a sample of the adhesive strength of a liquid crystal display panel of example 2. In example 2, alignment films for photo alignment are used as alignment films, and an array substrate and a counter-substrate are adhered to each other by an ultraviolet-setting type sealing material formed to have a volume shrinkage ratio of 1.2%, and ultraviolet lights are emitted onto the sealing material to cure the sealing material, thereby forming a sealing member.

As shown in FIG. 15, according to the result of a test conducted with respect to a breaking strength of the liquid crystal display panel of each of examples 1 and 2 (which is a strength thereof when the array substrate and the counter-substrate completely peel off), when the array substrate and the counter-substrate started to peel off, a strength of the liquid crystal display panel of example 1 was 6.0[N], and when the array substrate and the counter-substrate completely peeled off, the strength of the liquid crystal display panel of example 1, i.e., the breaking strength thereof, was 7.1[N]; and when the array substrate and the counter-substrate started to peel off, a strength of the liquid crystal display panel of example 2 was 19.7[N], and when the array substrate and the counter-substrate completely peeled off, the strength of the liquid crystal display panel of example 2, i.e., the breaking strength thereof, was 26.3[N].

As can be seen from the above, the higher a volume shrinkage ratio which a sealing material to be applied is formed to have, the lower the adhesive strength of the liquid crystal display panel. This is because the higher the volume shrinkage ratio which the sealing material to be applied is formed to have, the more easily the alignment films are pulled. In other words, it can be seen that the lower the volume shrinkage ratio, the higher the adhesive strength of the liquid crystal display panel.

Based on the above, it was conceived that even in the case of giving photo alignment treatment, the adhesive strength between the array substrate and the counter-substrate is increased by applying a sealing material formed to have a lower volume shrinkage ratio.

Also, other types of sealing materials were each applied in place of the above sealing material, and the breaking strength between the array substrate and the counter-substrate were tested. As a result, it was found that the lower the volume shrinkage ratio with respect to the entire sealing material, the higher the adhesive strength of the liquid crystal display panel. As the sealing material, the following three types of sealing materials can be applied:

(i) a sealing material which is of both an ultraviolet-setting type and a thermosetting type, and which is finally cured by heat treatment after being set by ultraviolet lights;

(ii) a sealing material which is of an ultraviolet setting type and finally cured by ultraviolet lights; and (iii) a sealing material which is of a thermosetting type and finally cured by heat treatment.

Furthermore, examination was made with respect to the volume shrinkage ratio of an ultraviolet-setting type sealing material in the case where the sealing material was cured by radiation of ultraviolet rays and that of a thermosetting type sealing material in the case where the sealing material was cured by heat treatment.

With respect to the thermosetting type sealing material, i.e., a sealing material subjected to heat treatment as in the sealing material described in the above item (iii), the volume shrinkage ratio was approximately 2%. From this, it is assumed that the temperature of the sealing material rose to a high temperature, thus activating molecules of the sealing material, and restricting shrinkage of the sealing material.

On the other hand, with respect to the thermosetting type sealing agent, i.e., a sealing material irradiated with ultraviolet lights as in the sealing materials described in the above items (i) and (ii), the volume shrinkage ratio was approximately 6%. From this, it is assumed that since the temperature of the sealing material was substantially equal to room temperature, molecules of the sealing material hardly acted, and thus could not restrict shrinkage of the sealing material. From the above, it is found that in the case where the sealing material is cured by ultraviolet lights, the volume shrinkage ratio is higher than that in the case where the sealing material is cured by heat treatment, and the adhesive strength of the liquid crystal display panel more easily lowers than in the case where the sealing material is cured by heat treatment.

The embodiment provides a liquid crystal display panel which can solve the above problems even if the photo alignment treatment is applied, and also provides a method of manufacturing the liquid crystal display panel, i.e., a method of manufacturing a liquid crystal display panel which is high in yield and display quality.

Next, in the embodiment, a means and a method for embodying the above concept to solve the above problems will be explained.

The liquid crystal display panel according to the embodiment and the method of manufacturing the liquid crystal display panel will be explained in detail with reference to the accompanying drawings. First of all, a structure of the liquid crystal display panel will be explained. In the embodiment, the liquid crystal display panel is of a counter CF type, and color filter is provided on a counter-substrate side.

As shown in FIGS. 1 to 7, the liquid crystal display panel comprises: an array substrate 1; a counter-substrate 2 located opposite to the array substrate 1 with a predetermined gap between the array substrate 1 and the counter-substrate 2; a liquid crystal layer 3 held between the array substrate 1 and the counter-substrate 2; and color filter 4. On outer surfaces of the array substrate 1 and the counter-substrate 2, polarizers not shown are provided, respectively. Also, on an outer surface side of the array substrate 1, a backlight unit not shown is provided. A liquid crystal display device comprises the liquid crystal display panel, the backlight unit, etc. The array substrate 1 and the counter-substrate 2 have a rectangular display area R1. The color filter 4 is provided in the display area R1 on the counter-substrate 2 side.

The array substrate 1 includes a glass substrate 11 as a transparent insulating substrate. In the display area R1, above the glass substrate 11, a plurality of scanning lines 15 and a plurality of signal lines 21 are arranged in a lattice pattern, the scanning lines 15 extending in a row direction X and being arranged in a column direction Y perpendicular to the row direction X, the signal lines 21 extending in the column direction Y to cross the scanning lines 15 and being arranged in the row direction X.

Above the glass substrate 11, auxiliary capacitance lines 17 are provided in auxiliary capacitance elements 24 such that they extend in the row direction X to cross the signal lines 21, and are arranged in the column direction Y. Also, the auxiliary capacitance lines 17 extend in parallel with the scanning lines 15.

The array substrate 1 and the counter-substrate 2 include a plurality of pixels 20 which are arranged in a matrix in such a manner as to overlap with areas surrounded by the signal lines 21 and the auxiliary capacitance lines 17. To be more specific, each of the pixels 20 is provided to overlap with an area surrounded by associated adjacent two of the signal lines 21 and associated adjacent two of the auxiliary capacitance lines 17. Furthermore, thin film transistors (TFTs) 19 are provided as switching elements in the pixels 20 of the array substrate 1, respectively. To be more specific, the TFTs 19 are located close to respective intersections of the scanning lines 15 and the signal lines 21.

The TFTs 19 each include a semiconductor layer 12 formed of amorphous silicon (a-Si) or polysilicon (p-Si) as a semiconductor and a gate electrode 16 extending from part of an associated one of the scanning lines 15.

More specifically, in the display area R1, on the glass substrate 11, the semiconductor layers 12 and auxiliary capacitance electrodes 13 are formed.

A gate insulating film 14 is provided on the glass substrates 11, the semiconductor layers 12 and auxiliary capacitance electrodes 13. The scanning lines 15, the gate electrodes 16 and the auxiliary capacitance lines 17 are provided on the gate insulating film 14. The auxiliary capacitance lines 17 and the auxiliary capacitance electrodes 13 hold the gate insulating film 14, and are located opposite to each other. Furthermore, interlayer insulating film 18 are provided on the gate insulating film 14, the gate electrodes 16, the auxiliary capacitance lines 17 and the scanning lines 15.

On the interlayer insulating film 18, the signal lines 21 and contact electrodes 22 are provided. Each of the contact electrodes 22 is connected to drain region of the semiconductor layer 12 through contact hole formed in the interlayer insulating film 18 and the gate insulating film 14, and pixel electrodes 26 which will be described later. Also, each of the contact electrodes 22 is connected to the auxiliary capacitance electrodes 13 through the contact hole formed in the interlayer insulating film 18 and the gate insulating film 14. It should be noted that the auxiliary capacitance line 17 is provided in areas excluding connection portions between the auxiliary capacitance electrode 13 and the contact electrode 22.

Each of the signal lines 21 is connected to source region of the semiconductor layer 12 through contact hole in the interlayer insulating film 18 and the gate insulating film 14. Protection insulating film 23 is formed on the interlayer insulating films 18, the signal lines 21 and the contact electrodes 22. Also, the protection insulating film 23 serves as flattening film which achieve flattening by covering irregularities due to wiring, etc. on the substrate. The protection insulating film 23 cover not only the display area R1, but a rectangular frame area R2 surrounding the display area R1. The frame area R2 is a non-display area.

On the protection insulating film 23, the pixel electrodes 26 are formed of transparent conductive films such as an indium tin oxide (ITO). In part of the protection insulating film 23 which are located on the contact electrodes 22, contact holes 25 are formed. In the contact holes 25, the pixels 20 are provided.

Each of the pixel electrodes 26 is connected to the contact electrodes 22 through the contact holes 25. Peripheral portion of the pixel electrode 26 faces the auxiliary capacitance lines 17 and the signal lines 21. Also, the pixel electrodes 26 are formed in the pixels 20.

In such a manner as described above, an array pattern 1P is provided on the glass substrate 11. To be more specific, in the display area R1, the array pattern 1p is stacked between the pixel electrodes 26 and the glass substrate 11.

In the display area R1 and the frame area R2, on the array pattern 1p (the pixel electrodes 26, the protection insulating film 23, etc.), an alignment film 28 is formed. The alignment film 28 is formed in an alignment-film formation area. In the embodiment, the alignment film 28 is provided over the entire area of the array pattern 1p and the glass substrate 11. Also, the alignment film 28 is formed of a photo-decomposition type of alignment film material, e.g., a photo-decomposition type of polyimide resin. In addition, the alignment film 28 is subjected to photo alignment treatment.

As shown in FIGS. 1 to 3, 6 and 7, the counter-substrate 2 comprises a glass substrate 41 which is a transparent insulating substrate. On the glass substrate 41, the color filter 4 is provided. The color filter 4 includes light-shielding portion 31 and peripheral light-shielding portion 32, and further each include a plurality of colored layers. The colored layers comprise, e.g., a red-colored layers 30R, a green-colored layer 30G and a blue-colored layer 30B.

The light-shielding portion 31 is formed in the shape of a lattice. Also, the light-shielding portion 31 is located opposite to the auxiliary capacitance lines 17 and the signal lines 21. The peripheral light-shielding portion 32 is rectangularly formed, and provided in the entire frame area R2. The peripheral light-shielding portion 32 serves as light shields against light (backlight) leaking from an area located outside the display area R1.

The colored layers 30R, 30G and 30B are provided on the glass substrate 41 and the light-shielding portion 31. The colored layers 30R, 30G and 30B extend in the column direction Y and are formed in the shape of a band. Also, the colored layers 30R, 30G and 30B are arranged adjacent to each other in the row direction X. Peripheral portions of the colored layers 30R, 30G and 30B are stacked on the light-shielding portion 31.

It should be noted that on the color filter 4, an overcoat layer not shown may be provided. It can reduce an influence of irregularities of surfaces of the light-shielding portion 31 and the color filter 4.

On the color filter 4 (the overcoat layer), counter-electrode 42 is formed of transparent conductive film such as ITO. In such a manner as described above, on the glass substrate 41, a counter-pattern 2p is formed. The counter-pattern 2p includes the color filter 4 and the counter-electrode 42. The counter-pattern 2p may further include the overcoat layer.

On the counter-pattern 2p, an alignment film 43 and a plurality of columnar spacers 80 are formed. The columnar spacers 80 are provided in at least the display area R1. Also, the columnar spacers 80 each have a height which can be set in accordance with a cell gap, i.e., 3 to 5 μm. It is preferable that the columnar spacers 80 be provided not only in the display area R1, but in the frame area R2. This is because in the frame area R2, a sealing member 51 is formed after being shrunk at a curing time as described later.

In the display area R1 and the frame area R2, on the counter-pattern 2p on which the columnar spacers 80 are provided, the alignment film 43 is disposed. Also, the alignment film 43 is located in the alignment-film formation area. In the embodiment, the alignment film 43 is provided over the entire area of the counter-pattern 2p and the glass substrate 41. The alignment film 43 is formed of a photo-decomposition type of alignment film material, e.g., a photo-decomposition type of polyimide resin. Also, the alignment film 43 is subjected to photo alignment treatment.

As shown in FIGS. 1 to 3 and 7, the array substrate 1 and the counter-substrate 2 are located opposite to each other, with a predetermined gap therebetween by the columnar spacers 80. The sealing member 51 is located in the frame area R2 and between the array substrate 1 (the alignment film 28) and the counter-substrate 2 (the alignment film 43). It is also rectangularly and continuously formed.

The array substrate 1 and the counter-substrate 2 are joined to each other (bonded together) by the sealing member 51. The sealing member 51 can be formed of resin such as acryl or epoxy. The sealing member 51 is adhered to the alignment film 28 and the alignment film 43.

The liquid crystal layer 3 is formed in space surrounded by the array substrate 1, the counter-substrate 2 and the sealing member 51.

The liquid crystal display panel is formed in the above manner.

Next, the structure of the liquid crystal display panel will be explained in more detail, along with the method of manufacturing the liquid crystal display panel.

As shown in FIGS. 1 to 7 and 8, a mother glass 101 serving as a first mother substrate is prepared as a transparent insulating substrate, the mother glass 101 having greater dimensions than the array substrate 1. According to the embodiment, the mother glass 101 includes six rectangular array-substrate formation areas R6 for formation of the array substrate 1 and a non-effective area R7 located outside the array-substrate formation areas R6. The mother glass 101 includes first to-be-divided lines e1 which coincide in position to peripheral areas of the array-substrate formation areas R6.

Figure 8:
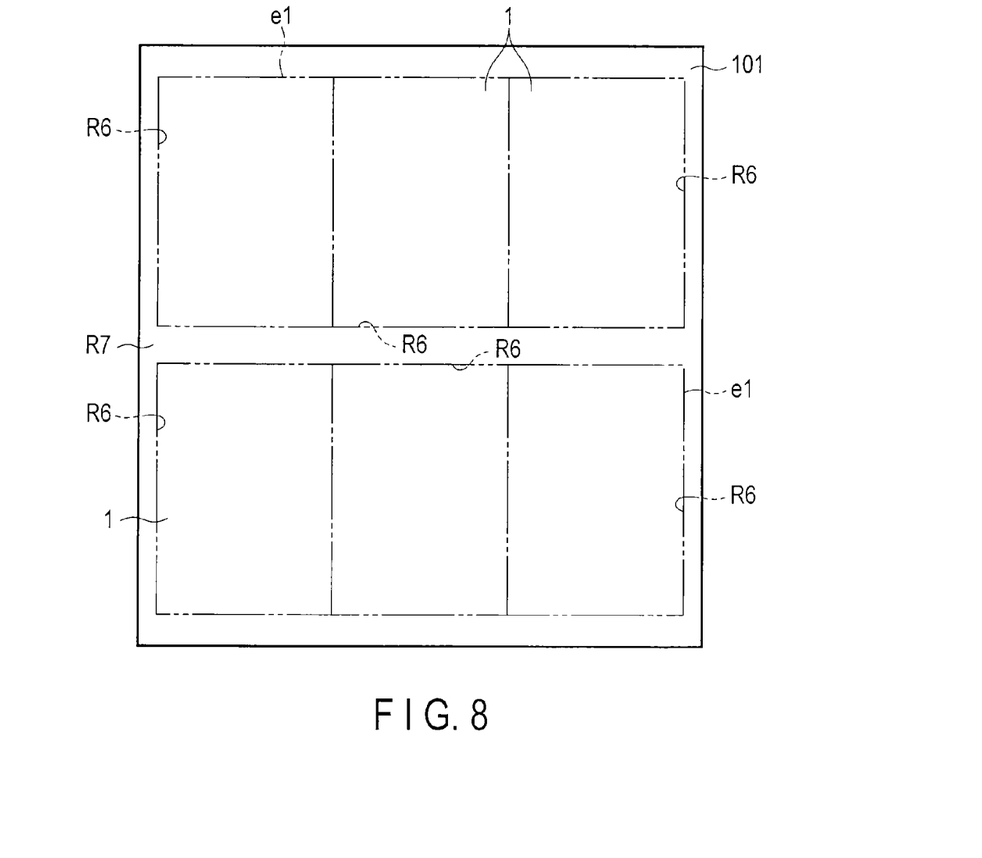
FIG. 8 is a plan view for use in explaining a step of a manufacturing method of the liquid crystal display panel, and also showing that an array pattern is formed on a mother glass.

On the prepared mother glass 101, the array pattern 1p, which includes the TFTs 19, the auxiliary capacitance elements 24, the protection insulating film 23, etc., is formed by carrying out general manufacturing steps, e.g., by repeating film formation and patterning.

Next, an alignment-film material coating area of the mother glass 101 is coated with a photo-decomposition type of alignment film material, and the alignment film 28 formed of the alignment film material is provided on the mother glass 101. For example, the mother glass 101 where the array pattern 1p is formed is coated with the alignment film material by a spin coating method, thus forming the alignment film 28. In the case of applying the spin coating method, the alignment-film material coating area is the entire upper surface of the mother glass 101.

It should be noted that the alignment film material can be applied by an ink jet method instead of by the spin coat method. In the case where the ink jet method is applied, the alignment-film material coating area may be limited to the array-substrate formation areas R6.

Thereafter, the alignment film 28 is subjected to photo alignment treatment (radiation of polarized UV).

Thereby, using the mother glass 101, six array substrates 1 are formed.

As shown in FIGS. 1 to 3, 6, 7 and 9, in a method of manufacturing the counter-substrate 2, first, a mother glass 102 serving as a second mother substrate having greater dimensions than the counter-substrate 2 is prepared as a transparent insulating substrate. According to the embodiment, the mother glass 102 includes six rectangular counter-substrate formation areas R8 for formation of the counter-substrate 2 and a non-effective area R9 located outside the counter-substrate formation areas R8. The mother glass 102 includes second to-be-divided lines e2 which coincide in position to peripheral areas of the array-substrate formation areas R8.

Figure 9:
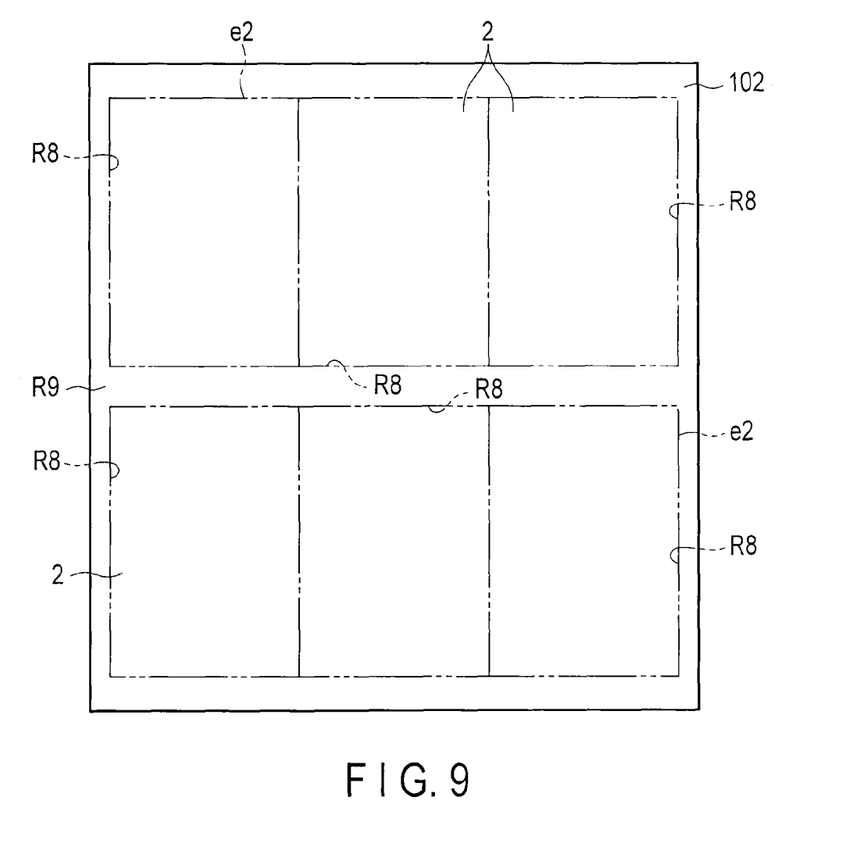
FIG. 9 is a plan view showing that in another step of the manufacturing method of the liquid crystal display panel, a counter-pattern is formed on another mother glass.

On the prepared mother glass 102, the counter-pattern 2p is formed by general manufacturing steps. Then, the following steps are successively carried out: the entire upper surface of the mother glass 102 is coated by a spinner with, e.g., photosensitive and acrylic transparent resin; the transparent resin is dried; the transparent resin is exposed using a predetermined photo-mask having a pattern; and after being developed, the exposed transparent resin is calcined and cured. As a result, the columnar spacers 80 are formed.

Thereafter, the alignment film 43 subjected to the photo alignment treatment is provided on the mother glass 102 on which the counter-pattern 2p is formed. In this case, the alignment film 43 can be formed by the same method as the alignment film 28.

Thereby, using the mother glass 102, six counter-substrates 2 are formed.

Figure 7:
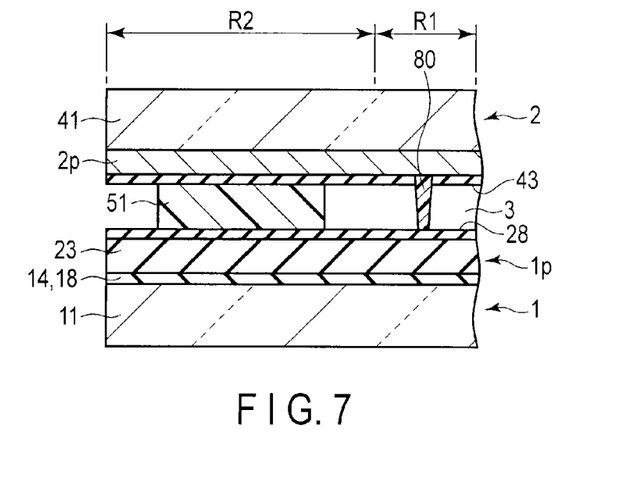
FIG. 7 is a view enlargedly showing a cross section of a peripheral portion of the liquid crystal display panel, which is taken along line VII-VII in FIG. 3.
Figure 10:
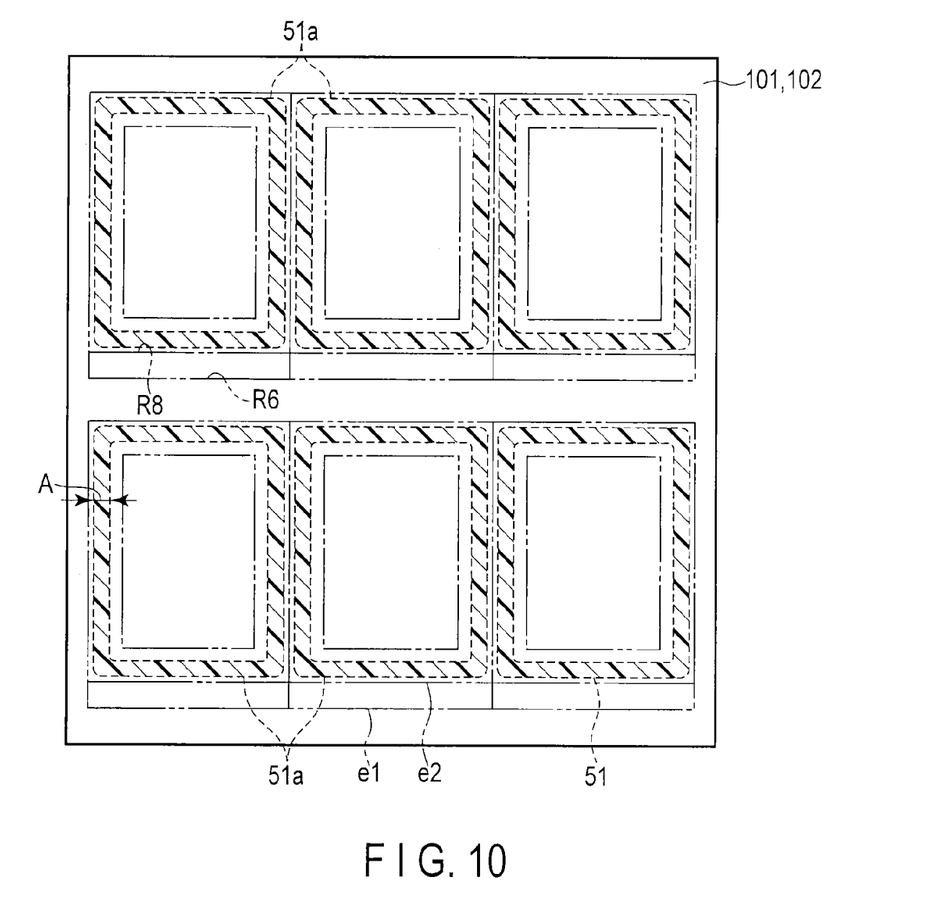
FIG. 10 is a plan view showing that in a further step of a manufacturing method of the liquid crystal display panel, a mother glass where six array substrates are formed is bonded by a sealing material to a mother glass where six counter-substrates are formed.

Then, as shown in FIGS. 7 and 10, a sealing material 51a is provided on the frame area R2 of the alignment film (28, 43) of either the mother glass 101 or the mother glass 102. The following explanation is given with respect to the case where the entire frame area R2 of the alignment film 28 of the array substrate 1 is coated with the sealing material 51a by a print method. As the sealing material 51a, for example, an ultraviolet-setting type sealing material or a thermosetting type sealing material can be applied. In this embodiment, the sealing material 51a is of both an ultraviolet-setting type and a thermosetting type. Thus, the sealing material 51a is formed in the shape of a frame.

Thereafter, a liquid crystal material is dropped onto an area surrounded by the sealing material 51a. Then, the mother glass 101 and the mother glass 102 are provided opposite to each other such that the alignment film 28 and the alignment film 43 face each other, and the array substrate 1 and the counter-substrate 2 are also provided opposite to each other, with a predetermined gas therebetween by the columnar spacers 80, and are then bonded to each other at their peripheral portions by the sealing material 51a.

Next, ultraviolet lights are externally radiated onto the sealing material 51a to cure the sealing material 51a, and a thermosetting treatment is applied to the sealing material 51a to finally cure the sealing material 51a. By the sealing member 51 formed by curing the sealing material 51a, the mother glass 101 and the mother glass 102 are bonded to each other.

Also, by bonding the mother glasses 101 and 102 together, the liquid crystal layer 3 can be formed in space surrounded by the mother glass 101, the mother glass 102 and the sealing member 51.

Next, the mother glass 101 is divided along the first to-be-divided lines e1, and the mother glass 102 is also divided along the second to-be-divided lines e2. To be more specific, this division is carried out, for example, by drawing scribe lines along the first to-be-divided lines e1 and the second to-be-divided lines e2. As a result, the array substrates 1 and the counter-substrates 2 are cut out from the mother glass 101 and the mother glass 102, respectively.

Figure 1:
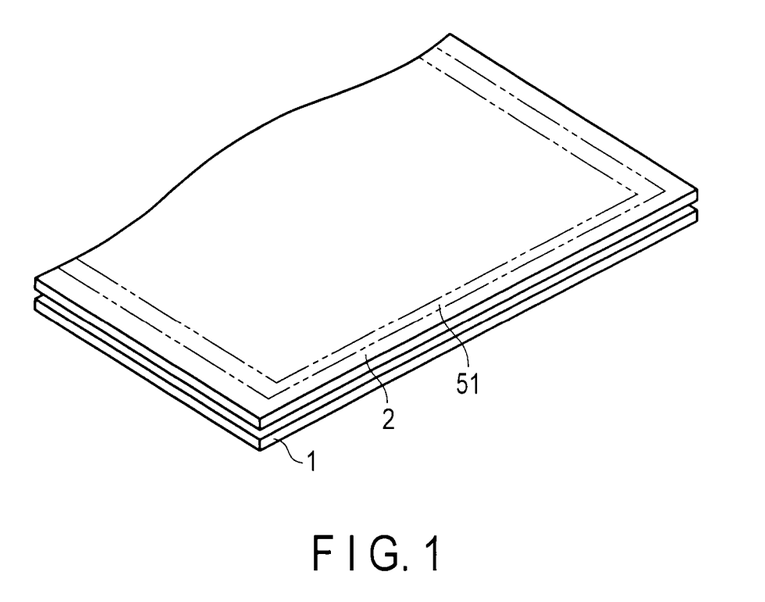
FIG. 1 is a perspective view showing a liquid crystal display panel according to an embodiment.
Figure 2:
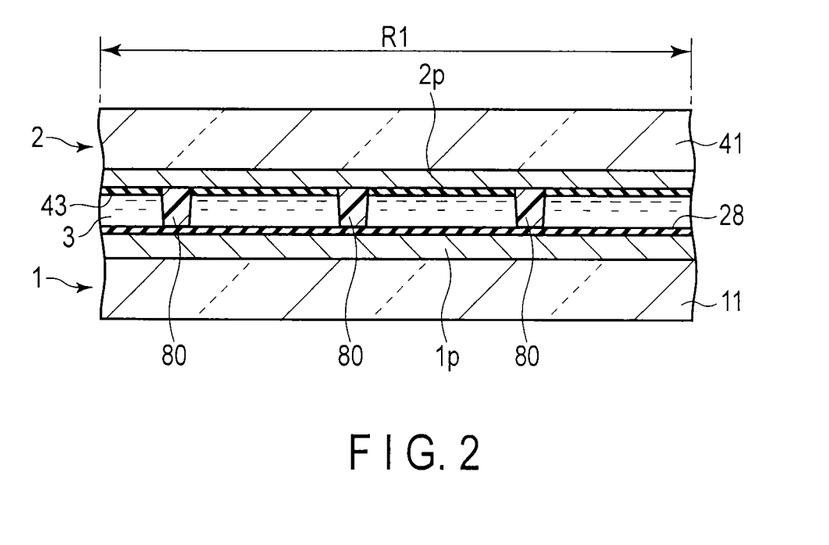
FIG. 2 is a view schematically showing a cross section of the liquid crystal display panel.
Figure 3:
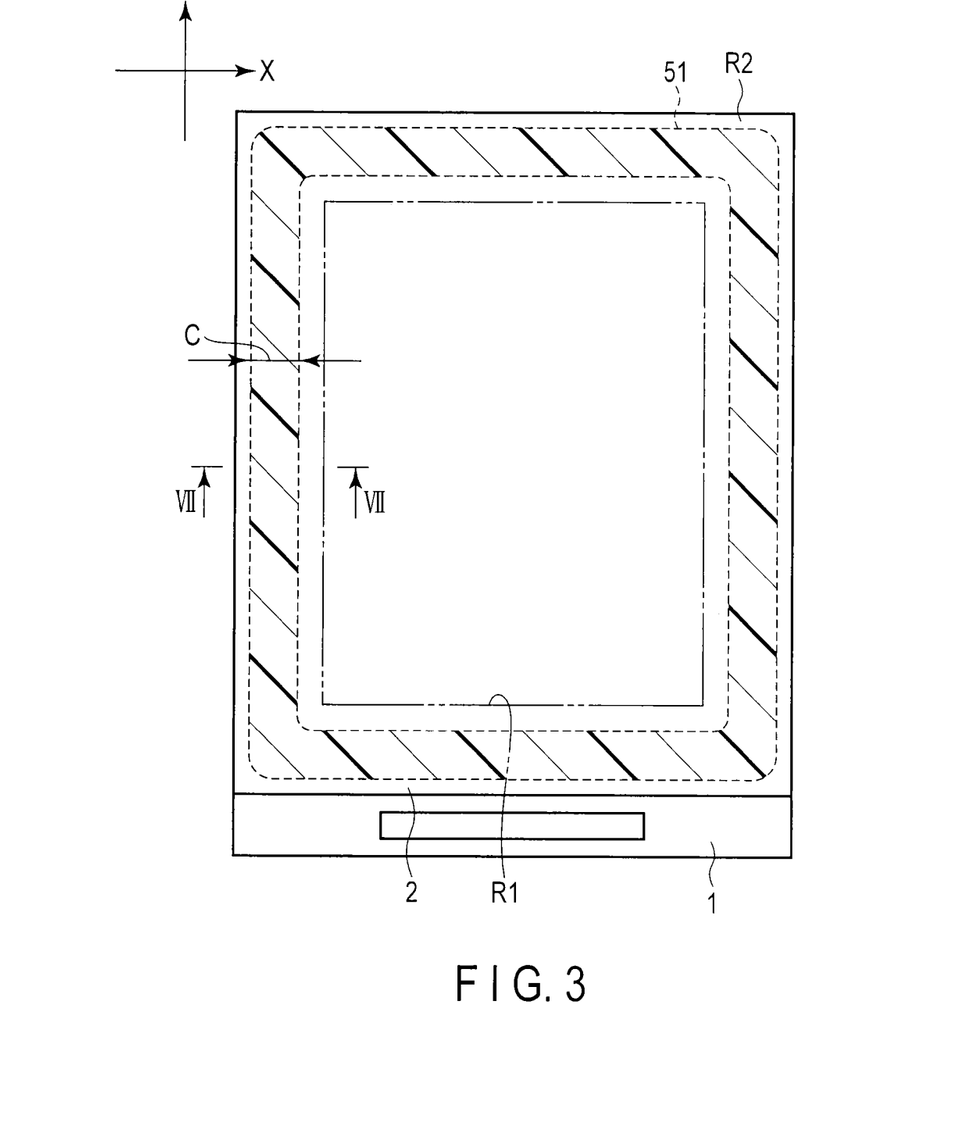
FIG. 3 is a plane view schematically showing the liquid crystal display panel.
Figure 4:
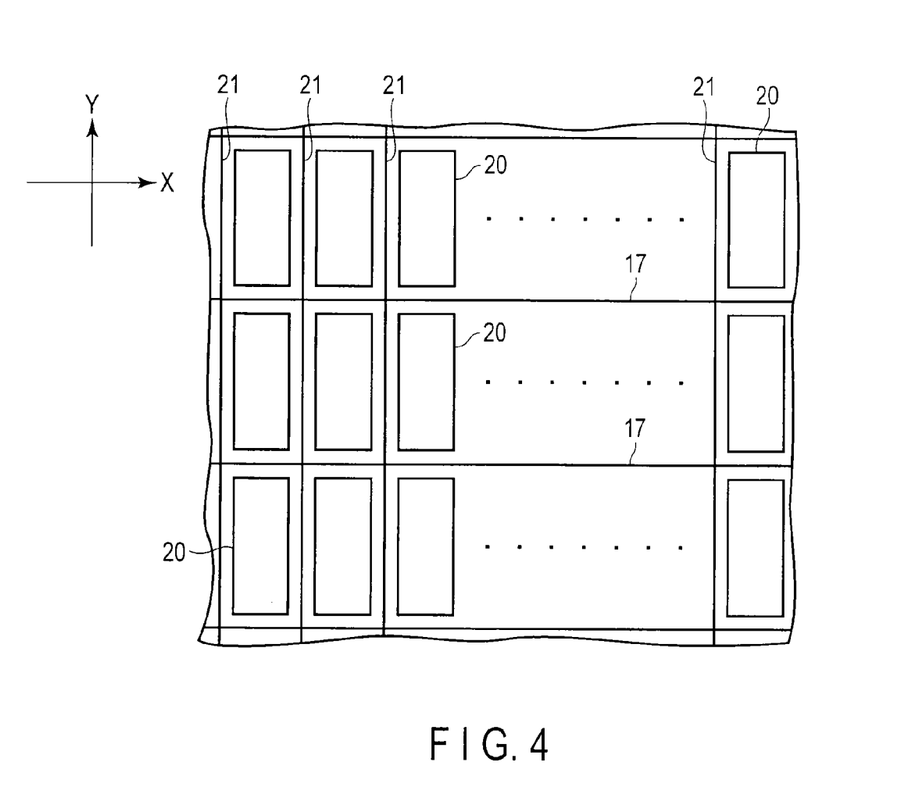
FIG. 4 is a plan view schematically showing part of an array substrate as shown in FIGS. 1 to 3.
Figure 5:
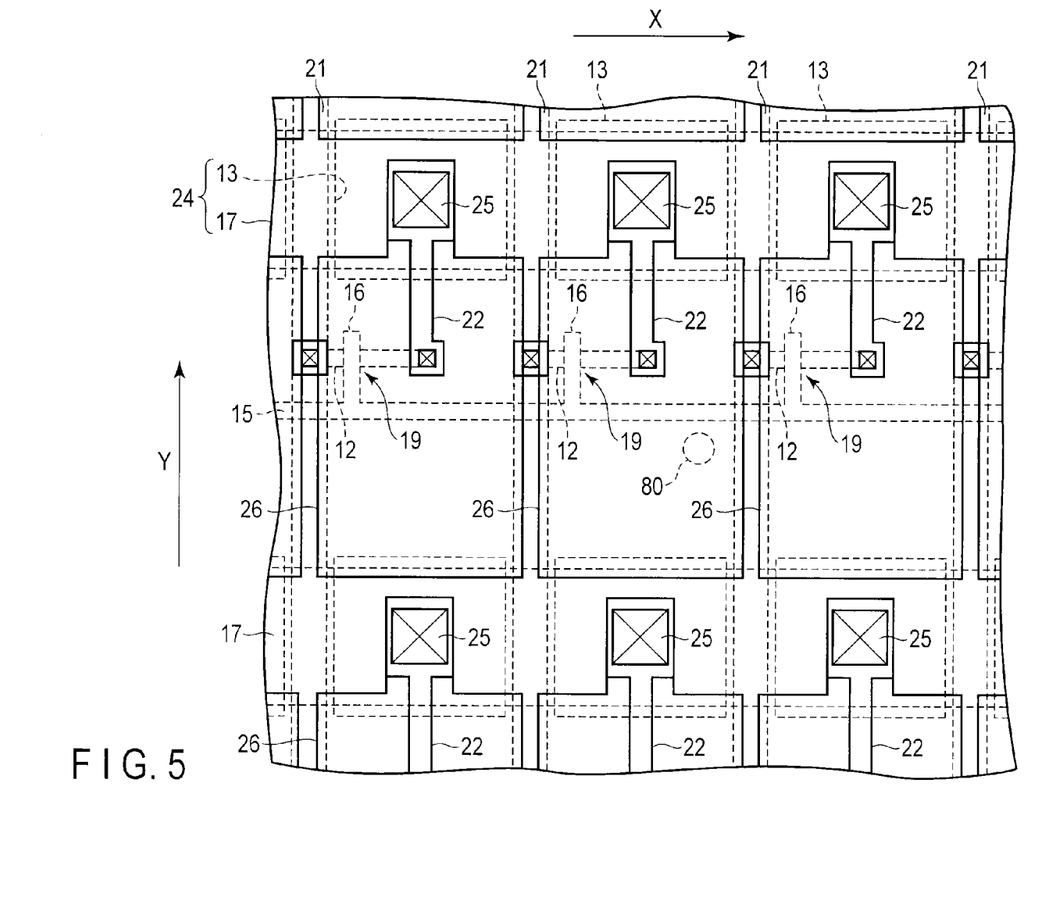
FIG. 5 is a plan view enlargedly showing the array substrate and also showing a wiring structure of the array substrate.
Figure 6:
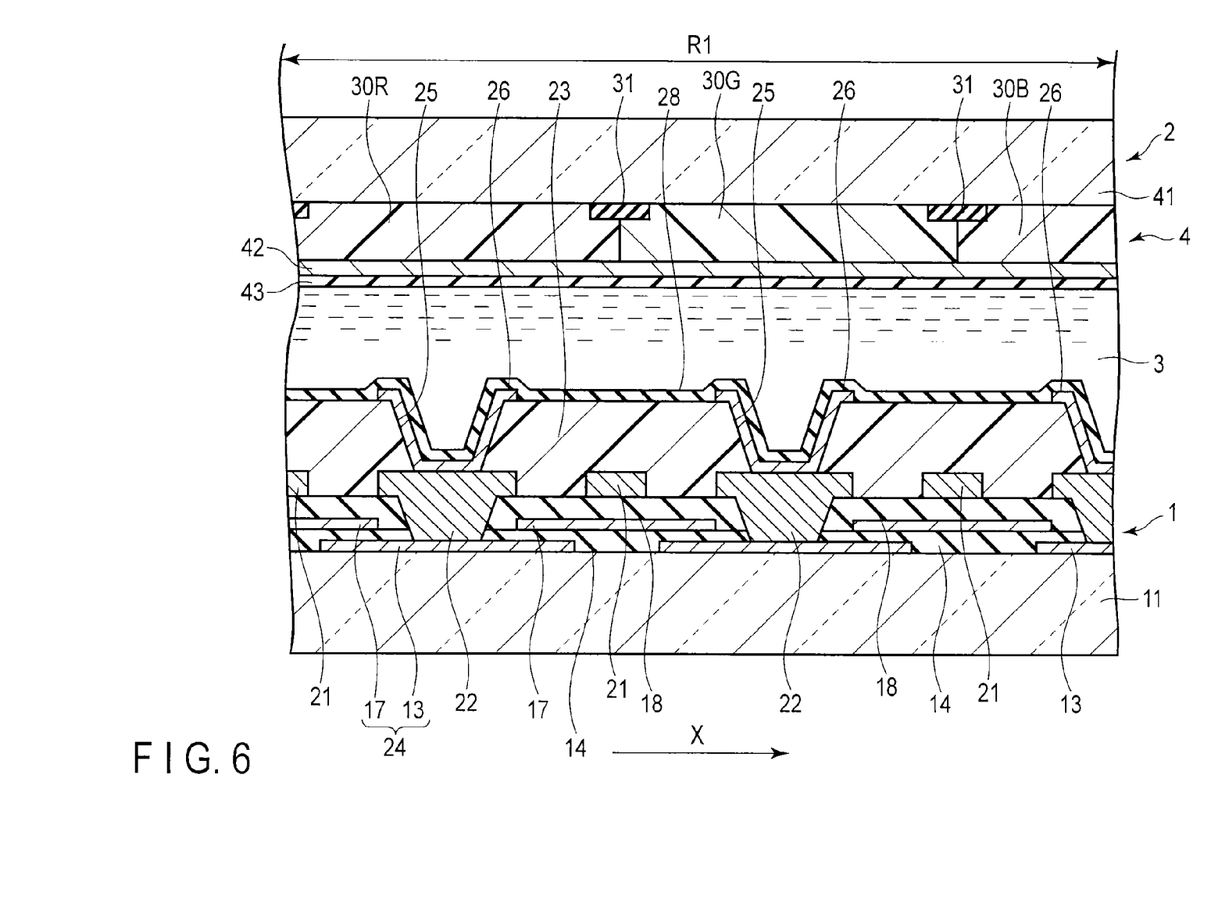
FIG. 6 is a view enlargedly showing a cross section of the liquid crystal panel and also showing a structure of the liquid crystal display panel.

Thereby, as shown in FIG. 3, six liquid crystal display panels are taken from the cut mother glasses 101 and 102; that is, formation of the six liquid crystal display panels is completed.

It should be noted that the following explanation is given, where A is a width (μm) of the sealing material 51a, which is not cured, though the alignment film 28 and the alignment film 43 are in contact with each other, as shown in FIG. 10; B is a volume shrinkage ratio (%) of the sealing material 51a in the case where the sealing material 51a is cured to form the sealing member 51; and C is a width of the sealing member 51, which is obtained by curing, as shown in FIG. 3.

In the embodiment, a sealing material 51a formed to have a volume shrinkage ratio B of 2% was used. It should be noted that the volume shrinkage ratio B is a volume shrinkage ratio of the sealing material 51a in the case where the sealing material 51a is cured by ultraviolet lights and heat to form a sealing member 51. As the width A of the above sealing material 51a was 1000 μm, the width C of the formed sealing member 51 was 980 μm.

Furthermore, before curing the sealing material 51a, a cell gap of the frame area R2 was 3 μm, and after curing the sealing material 51a to form the sealing member 51, the cell gap of the frame area R2 was 2.94 μm; that is, the cell gap slightly changed. This was because the columnar spacers 80 were not formed in the frame area R2. It is therefore preferable that as describe above, the columnar spacers 80 be also formed in the frame area R2.

According to the embodiment, in the liquid crystal display panel having the above structure and the method of manufacturing the liquid crystal display panel, in the case of manufacturing the liquid crystal display panel, first, a pair of substrates having respective alignment film 28 and 43 subjected to the photo alignment treatment are prepared. Then, a sealing material 51a is provided on a frame area R2 of an alignment film (28, 43) in one of the pair of substrates.

It should be noted that the above used sealing material 51a contains two components: i.e., acrylic resin and epoxy resin, and is of both an ultraviolet-setting type and a thermosetting type. Its volume shrinkage ratio B is 2% as described above.

Thereafter, the pair of substrates are bonded together by a sealing material 51a, the width A of which is 1000 μm. Then, after being irradiated with ultraviolet lights, the sealing material 51a is subjected to thermosetting treatment, as a result of which it is cured to form a sealing member 51. Also, when the pair of substrates are bonded together by the sealing member 51, a liquid crystal layer 3 is formed in space surrounded by the pair of substrates and the sealing member 51.

As described above, the photo alignment treatment can be applied as the alignment treatment for the alignment films 28 and 43. It is therefore possible to obtain the following advantages, which cannot be obtained in the case of applying rubbing treatment.

Firstly, liquid crystal display panels can be manufactured with a high yield, and a method of manufacturing liquid crystal display panels with a high yield can be obtained. This is because since it is unnecessary to apply rubbing treatment to the alignment films 28 and 43, thus solving a problem in which elements (e.g., TFT 19) are broken by static electricity generating due to friction.

Further, liquid crystal display panels can display an image with a high quality, and a method for manufacturing liquid crystal display panels which can display an image with a high quality can be obtained. This is because it is possible to solve a problem in which a display failure (disorder in alignment of liquid crystal molecules LM) occurs due to dust generating due to rubbing.

In addition, as described above, it is possible to reduce the amount of shrinkage (movement amount) of the sealing material 51a by adjusting the volume shrinkage ratio B with respect to the sealing material 51a in advance in association with the width A thereof. In the embodiment, on one of edge sides of the sealing material 51a, the movement amount of the sealing material 51a was 10 μm. Thus, a liquid crystal display panel having a high adhesive strength could be obtained. Therefore, according to the embodiment, liquid crystal display panels can be manufactured with a higher yield, and a method of manufacturing liquid crystal display panels with a higher yield can be obtained. In addition, the manufacturing yield of liquid crystal display panels can be further improved, since the adhesive strengths thereof are high as described above.

In such a manner, according to the embodiment, liquid crystal panels having a high display quality can be manufactured with a higher yield, and a method of manufacturing liquid crystal panels having a high display quality with a higher yield can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the width A of the sealing material 51a is not limited to 1000 μm, and can be variously set. In this case, it is possible to obtain a liquid crystal display panel having a high adhesive strength by applying a sealing material 51a which is adjusted to have an appropriate volume shrinkage ratio B (it is possible to restrict lowering of the adhesive strength of the liquid crystal display panel).

Figure 11:
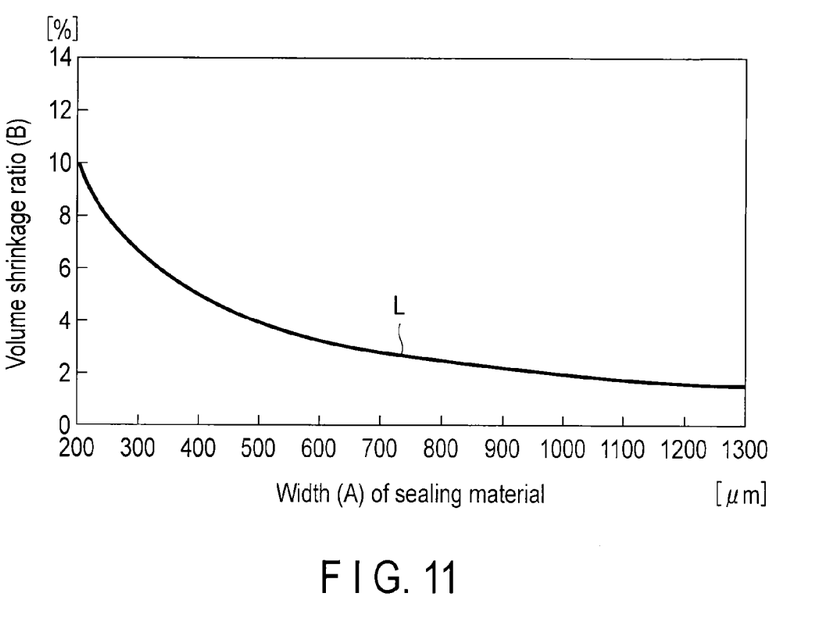
FIG. 11 is a view graphically showing variation of a volume shrinkage ratio which the sealing material is formed to have, and which depends on a width of the sealing material.

It should be noted that FIG. 11 shows a result of examination with respect to a relationship between the width A of the sealing material 51a and the volume shrinkage ratio B of the sealing material 51a, from which the adhesive strength of the liquid crystal display panel is estimated.

As shown in FIG. 11, according to the result of the examination, when a sealing material 51a having such a characteristic as indicated by curve L, i.e., a sealing material 51a the width A and the volume shrinkage ratio B of which are set to values or less, which vary as shown by curve L, was applied, a sufficiently high adhesive strength was obtained. For example, it is preferable that when the width A is 1000 μm, the volume shrinkage ratio B be equal to or less than 2%, and when the width A is 500 μm, the volume shrinkage ratio B be equal to or less than 4%.

From the above result, it is found that the same advantages as described above with respect to the embodiment can be obtained by applying a sealing material 51a which satisfies the following formula:

$$B[\%] \leq 2000[\mu m]/A[\mu m]$$

The sealing material 51a is not limited to the above sealing material (i), and various sealing materials can be applied as the sealing material 51a.

To be more specific, the sealing material (ii) can be applied as the sealing material 51a. For example, a sealing material containing acrylic resin can be applied. In this case, the volume shrinkage ratio B is a volume shrinkage ratio of the sealing material 51a in the case where the sealing material 51a is cured by ultraviolet lights to form the sealing member 51.

Also, as the sealing material 51a, the sealing material (iii) can be applied. For example, a sealing material containing epoxy resin can be applied. In this case, the volume shrinkage ratio B is a volume shrinkage ratio of the sealing material 51a in the case where the sealing material 51a is cured by heat to form the sealing member 51.

Application of the above technique according to the embodiment is not limited to the above liquid crystal display panel or the method of manufacturing the same. That is, the above technique can also be applied to various kinds of liquid crystal display panels and methods of the manufacturing liquid crystal display panels. The method of injecting the liquid crystal material is not limited to the method of dropping the liquid crystal material. As such an injection method, a vacuum injection method can also be applied.

What is claimed is:

1. A method of manufacturing a liquid crystal display panel, comprising:
    preparing a pair of substrates including respective alignment films formed therein and subjected to photo alignment treatment;

providing a sealing material on a frame area of the alignment film of one of the pair of substrates;

bonding the pair of substrates to each other with the sealing material, and curing the sealing material to form a sealing member; and forming a liquid crystal layer in space surrounded by the pair of substrates and the sealing member, wherein the sealing material satisfies the following formula:

$$B \leq 2000[\mu m]/A$$

where A is a width (μm) of the sealing material, and B is a volume shrinkage ratio (%) of the sealing material in a case where the sealing material is cured to form the sealing member.

2. The method of claim 1, wherein the sealing material is of both a ultraviolet-setting type and a thermosetting type, and the volume shrinkage ratio (B) is a volume shrinkage ratio of the sealing material in a case where the sealing material is cured by ultraviolet lights and heat to form the sealing member.

3. The method of claim 2, wherein the sealing material contains acrylic resin and epoxy resin.

* * * * *